United States Patent [19]

Green et al.

[11] Patent Number: 4,938,734
[45] Date of Patent: Jul. 3, 1990

[54] BELT TENSIONER AND METHOD OF MAKING THE SAME

[75] Inventors: Nancy M. Green; Mark P. Foley, both of Springfield, Mo.

[73] Assignee: Dayco Products, Inc., Dayton, Ohio

[21] Appl. No.: 403,537

[22] Filed: Sep. 6, 1989

[51] Int. Cl.⁵ ............................................. F16H 7/12
[52] U.S. Cl. ................................................... 474/135
[58] Field of Search ........................ 474/101, 109–111, 474/113–117, 133, 135, 136, 138

[56] References Cited

U.S. PATENT DOCUMENTS

| | | | |
|---|---|---|---|
| 4,596,538 | 6/1986 | Henderson | 474/135 |
| 4,661,087 | 4/1987 | Henderson | 474/135 |
| 4,784,631 | 11/1988 | Henderson | 474/135 |
| 4,832,666 | 5/1989 | Henderson | 474/135 |

Primary Examiner—Thuy M. Bui
Attorney, Agent, or Firm—Joseph V. Tassone

[57] ABSTRACT

A belt tensioner and method of making the same are provided, the tensioner comprising a support for being fixed relative to a belt, a belt engaging unit carried by the support and being movable relative thereto, a spring operatively associated with the support and the belt engaging unit for urging the belt engaging unit relative to the support and against the belt with a force to tension the belt, and a frictional dampening unit operatively associated with the support and the belt engaging unit to dampen the movement of the belt engaging unit relative to the support, the dampening unit comprising a pair of frictionally engaging first and second parts with the first part comprising an annular pad of friction material that is coaxially disposed and axially movable on a shaft of the support relative to the second part, and a second spring urging the first part against the second part with a certain spring force, the first part of the dampening unit having a guide thereon, one of the support and the belt engaging unit having an opening therein that receives the guide therein to guide axial movement of the first part, the annular pad and the guide of the first part of the dampening unit comprising a one-piece homogeneous member.

20 Claims, 1 Drawing Sheet

BELT TENSIONER AND METHOD OF MAKING THE SAME

BACKGROUND OF THE INVENTION

1. Field of the Invention

This invention relates to a new tensioner for a power transmission belt or the like and to a new method of making the same.

2. Prior Art Statement

It is known to provide a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the first part of the dampening means having guide means thereon, one of the support means and the belt engaging means having opening means therein that receive the guide means therein to guide axial movement of the first part. For example, see the Henderson U.S. Pat. No. 4,596,538.

It is also known to provide a cup-shaped bushing of polymeric material between a belt engaging arm and an end plate of a support means to provide for rotational movement of the belt engaging means relative to the end cap of the support means, the cup-shaped bushing having the tubular sleeve portion thereof being loosely disposed between the outer peripheral surface of the end plate and a concentrically disposed part of the belt engaging arm.

SUMMARY OF THE INVENTION

It is one feature of this invention to provide a new belt tensioner having a reduced number of parts with the remaining parts performing all of the functions of the prior known tensioner having dampening means.

In particular, it was found according to the teachings of this invention that the annular friction pad, the force plate for the friction pad and an end plate bushing could be combined into a single member that would function in the same manner as the components replaced thereby whereby it is believed that an improvement will result in the production costs for the tensioner as fewer production parts and less time is required for the assembly thereof.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the first part of the dampening means having guide means thereon, one of the support means and the belt engaging means having opening means therein that receive the guide means therein to guide axial movement of the first part, the annular pad and the guide means of the first part of the dampening means comprising a one-piece homogeneous member.

It is another feature of this invention to utilize such unique one-piece member of the dampening means of the belt tensioner to tend to reduce the belt engaging means from tending to cock on its shaft means due to the force of the belt being tensioned thereby acting on the pulley means of the belt engaging means in an offset relation to the shaft means for the belt engaging means.

In particular, it was found that when a pulley means of a belt engaging means of a belt tensioner has the belt engaging surface thereof disposed outside the axial length of the shaft means that carries the belt engaging means, there is a tendency of the belt engaging means to cock on the shaft means and thereby tend to rapidly wear out the bushing means of the shaft means that is disposed between the shaft means and the belt engaging means to facilitate rotatable movement therebetween.

However, it was found according to the teachings of this invention that the unique one-piece member of the dampening means of the tensioner of this invention can cooperate with the belt engaging means and the end plate or end cap of the belt tensioner in such a manner that the end plate tends to prevent adverse cocking of the belt engaging means on its shaft means as will be apparent hereinafter.

Accordingly, it is an object of this invention to provide a new tensioner for a power transmission belt that is adapted to be operated in an endless path, the tensioner of this invention having one or more of the novel features of this invention as set forth above or herinafter shown or described.

Another object of this invention is to provide a new method of making such a tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
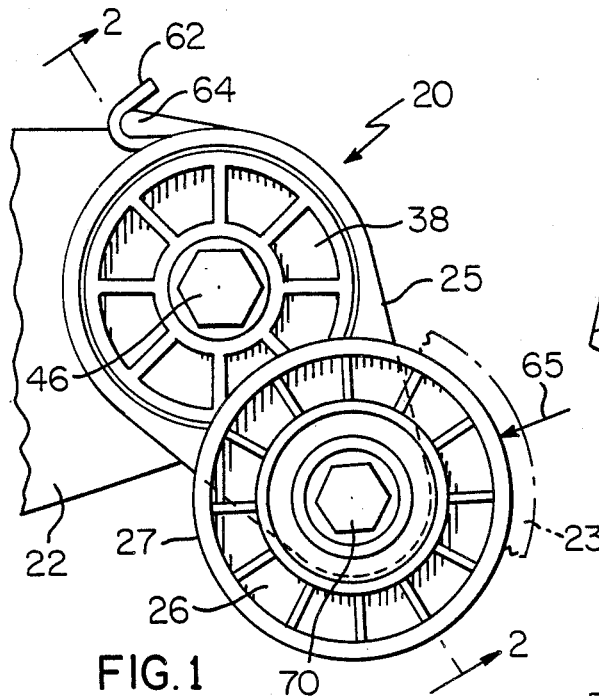
FIG. 1 is a front view of the new belt tensioner of this invention.

While the various features of this invention are hereinafter illustrated and described as being particularly adapted to provide a belt tensioner for use with an internal combustion engine for a transportation vehicle or the like, it is to be understood that the various features of this invention can be utilized singly or in various combinations thereof to provide a belt tensioner for other types of apparatus as desired.

Therefore, this invention is not to be limited to only the embodiment illustrated in the drawings because the drawings are merely utilized to illustrate one of the wide variety of uses of this invention.

Figure 3:
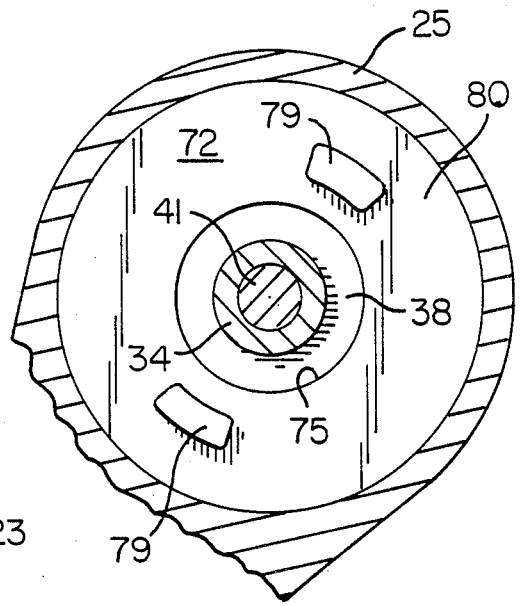
FIG. 3 is a fragmentary cross-sectional view taken on line 3—3 of FIG. 2.
Figure 2:
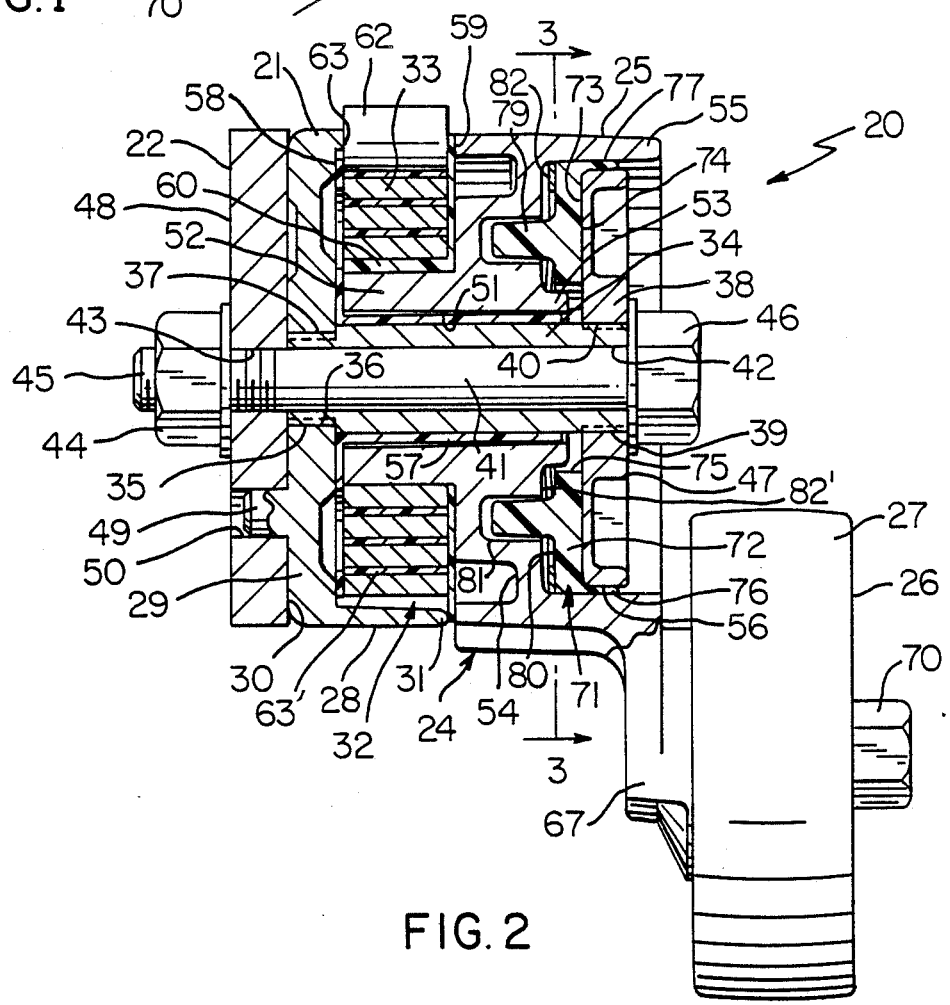
FIG. 2 is an enlarged fragmentary cross-sectional view taken on line 2—2 of FIG. 1 and illustrates the tensioner of this invention mounted to a suitable support structure.
Figure 4:
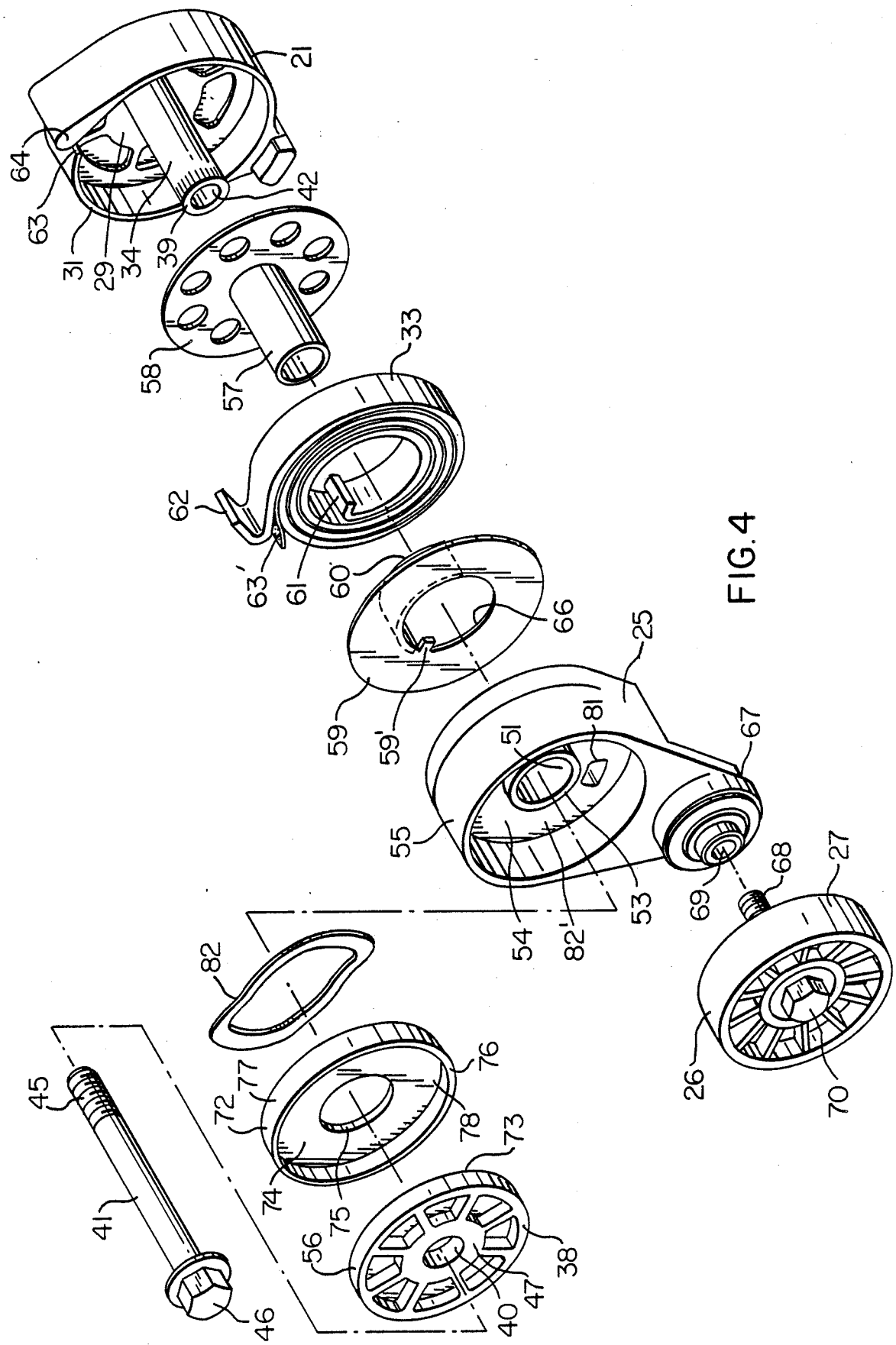
FIG. 4 is an exploded perspective view of the various parts that form the belt tensioner of FIGS. 1–3.

Referring now to FIGS. 1, 2 and 3, the new tensioner of this invention is generally indicated by the reference numeral 20 and comprises a support means 21 that is fixed to a supporting structure 22, such as a support bracket for an internal combustion engine (not shown) of a transportation vehicle (not shown) or the like so that the support means 21 is fixed from movement relative to a power transmission belt 23 that is adapted to be operated in an endless path and that is illustrated by dashed lines in FIG. 1, the belt tensioner 20 also comprising a belt engaging means that is generally indicated by the reference numeral 24 and comprising a belt engaging arm or portion 25 that is rotatably mounted on the support means 21 in a manner hereinafter set forth and carrying a rotatable pulley 26 having an external peripheral surface 27 adapted to engage the belt 23 to tension the same in a manner and for reasons well known in the art. For example, see the aforementioned Henderson U.S. Pat. No. 4,596,538, which patent is being incorporated into this disclosure by this reference thereto.

Thus, since, in general, the structure and operation of the tensioner 20 of this invention is well known in the art, only the details believed necessary to understand the unique features of this invention will now be described.

The support means 21 comprises a generally cup-shaped housing member 28 having a closed end wall 29 that is adapted to abut against a surface 30 of the support bracket 22 and having an open end 31 which defines a chamber 32 therein for receiving a torsion spring 33 in a manner hereinafter set forth for providing the tensioning force on the belt 23 in a manner well known in the art.

The support means 21 also comprises a tubular shaft means 34 that has one end 35 disposed in an opening 36 of the end wall 29 of the cup-shaped housing member 28 and being secured therein in any suitable manner, such as by the pressfit knurling means that is indicated by the reference numeral 37 in FIG. 2 as the cup-shaped housing member 21 and tubular shaft means 34 are formed of any suitable metallic material. Thus, the shaft means 34 is fixed from rotating relative to the housing member 28.

The support means 21 also comprises a metallic end plate or end cap 38 that is secured to the other end 39 of the shaft means 34 in any suitable manner, such as by the end 39 being knurled and press fitted into an opening 40 passing centrally through the end cap 38 whereby the end plate 38 is fastened to the shaft means 34, so as to not rotate relative thereto and, thus, to the cup-shaped member 28 which is fixed from rotating relative to the support bracket 22 by having a single bolt 41 pass through a central opening 42 through the shaft means 34 as well as through an aligned opening 43 in the support plate 22 to have a suitable nut means 44 threaded onto its threaded end 45 to compact an enlarged head means 46 of the bolt 41 against a side 47 of the end plate 38 while the nut means 44 compacts against a rear side 48 of the support plate 22 in a manner well known in the art. In order to prevent the support means 21 from rotating on the single bolt means 41, the cup-shaped member 28 has a projection means 49 extending rearwardly therefrom and being received in an opening 50 formed through the support plate 22 in offset relation to the bolt opening 43 thereof whereby the projection 50 prevents the support means 21 from rotating relative to the support plate 22 on the single bolt means 41 in a manner well known in the art.

The belt engaging portion or arm 25 has an opening 51 passing centrally therethrough with the portion 25 thereby defining opposed aligned tubular hub portions 52 and 53 extending outwardly from opposite sides of an intermediate web-like portion 54 that integrally interconnects with an outer peripteral cylindrical portion 55 that is disposed in a concentric manner about an outer peripheral portion 56 of the end plate 38 when the portion 25 of the belt engaging means 24 is telescoped onto the shaft means 34 in the assembled relation illustrated in FIG. 2.

In this manner, the portion 25 of the belt engaging means 24 substantially closes the open end 31 of the cup-shaped support member 28 to confine the torsion spring 33 therein.

However, a bearing sleeve 57 formed of any suitable anti-friction material, such as polymeric material, is telescoped on the shaft means 34 so as to provide a bearing means between the shaft means 34 and the portion 25 of the belt engaging means 24, the bearing means 54 being integral with a disc-like plate 58 which is disposed between the torsion spring 33 and the end wall 29 of the cup-shaped member 28 to provide anti-friction means between the torsion spring 33 and the end wall 29.

Likewise, a disc-like member 59 of any suitable anti-friction material, such a polymeric material, is disposed between the belt engaging portion 25 of the belt engaging means 24 and the torsion spring 33 to tend to reduce the friction between the belt engaging portion 25 and the torsion spring 33 during operation of the tensioner 20. The disc member 59 may have an integral protection member 60 extending from one side thereof to cooperate with the torsion spring 33 in a manner fully set forth in the aforementioned Henderson U.S. Pat. No. 4,596,538.

In particular, the metallic torsion spring 33 is coiled in a spiral relation to define an inner end 61 thereof and an outer end 62 thereof and can have a strip of anti-friction material 63' interleaved between the coils thereof in a manner well known in the art, the torsion spring 33 being disposed in the chamber 32 of the housing means 28 and having its inner end 61 operatively interconnected to the belt engaging arm 25 by being received in a suitable slot (not shown) formed in the tubular hub portion 52 thereof while the other end 62 of the torsion spring 33 extends out of a slot means 63 of the housing means 28 and hooks over the edge means 64 thereof so as to operatively interconnect the spring 33 to the support means 21. If desired, a suitable flexure closure member (not shown) can thereafter be disposed in the slot means 63 to close the same.

In this manner, the torsion spring 33 can initially be so wound that the same always tends to rotate the belt engaging arm 25 in a clockwise direction when viewing the tensioner in FIG. 1 whereby it can be seen that the belt 23 being tensioned by such counterclockwise movement of the belt engaging arm 25 imposes a load on the pulley 26 that is represented by the arrow 65 in FIG. 1.

The disc-like member 59 of anti-friction material has a central opening 66 pasing therethrough so as to be telescoped onto the hub portion 52 of the belt engaging arm 25 and thereby be disposed between the portion 25 of the belt engaging means 24 and the torsion spring 33 so as to facilitate movement therebetween, the protective member 60, if used, of the disc-like member 59 being disposed under the first coil of the torsion spring 33 adjacent the end 61 thereof to prevent cracking of the torsion spring 33 all for the reasons that are fully set forth in the aforementioned patent to Henderson U.S. Pat. No. 4,596,538, and need not be further described.

In order to fix the member 59 from rotating relative to the belt engaging portion 25, the member 59 may have a tang 59' that is received in the previously described spring receiving slot (not shown) in the hub portion 52 of the belt engaging portion 25.

The pulley 26 is rotatably mounted to an end 67 of the belt engaging arm 25 by having a threaded shaft means 68 thereof passing through an opening means 69 of the belt engaging arm means 24 and being secured thereto by a nut means 70 so that the pulley 26 can rotate on its shaft means relative to the belt engaging means 24 in a manner conventional in the art.

The tensioner 20 has frictional dampening means that is generally indicated by the reference numeral 71 in FIG. 2 and that is utilized to tend to retard rotary movement of the belt engaging portion 25 on the shaft means 34 for reasons well known in the art, such as fully set forth in the aforementioned Henderson U.S. Pat. No. 4,596,538.

The friction dampening means 71 comprises a unique one-piece member 72 of this invention that is formed of any suitable material that can act as a pad of friction material when the same is spring urged against a flat annular surface 73 of the end plate 38 as will be apparent hereinafter. For example, the member 72 can be formed of a suitable polymeric material, such as Nylastron GS-51 sold by The Polymer Corporation of Reading, Pennsylvania.

Thus, while the material forming the member 72 of this invention is normally used as an anti-friction material for bushings and the like, it has been found that the same will act as a friction material when being spring urged or compressed between relatively moving members as will be apparent hereinafter.

The member 72 is substantially cup-shaped and has a closed end wall disc portion 74 provided with a central opening 75 passing therethrough so as to permit the member 72 to be telescoped onto the tubular hub portion 53 of the belt engaging portion 25 as illustrated, the member 72 having an open end 76 that defines a sleeve-like cylindrical portion 77 at the outer peripheral end 78 of the disc portion 74 thereof. The sleeve-like portion 77 of the member 72 is adapted to be disposed between the cylindrical portion 55 of the belt engaging portion 25 and the outer peripheral surface 56 of the end cap 38 in an intimate manner therewith so as to tend to prevent the belt engaging portion 25 from tending to cock on the shaft means 34 because of the pulley 26 being offset out of alignment with the shaft means 34.

In particular, it was found that the force load 65 of the belt 23 on the pulley 26 tends to cause the belt engaging portion 25 to cock on the shaft means 34 of the support means 21 and, thus, adversely wear out the bearing means 57, such cocking of the arm means 25 being particular noticeable when the belt engaging surface 27 of the pulley 26 is offset out of the axial length of the shaft means 34 as is relatively apparent when viewing the tensioner 20 in the position of FIG. 2 thereof.

However, it was found according to the teachings of this invention that such adverse cocking of the arm means 25 can be prevented if the sleeve-like portion 77 of the member 72 of this invention is in intimate contact between the cylindrical portion 55 of the belt engaging means 25 and the outer peripheral surface 56 of the end plate 38 so as to counter the belt force 65 and hold the arm means 25 from cocking on the shaft means 34 even though the load force 65 is offset relative to the shaft means 34.

It was also found according to the teachings of this invention that when the sleeve-like portion 77 is being compressed between the portion 55 of the belt engaging arm 24 and the outer periphery 56 of the end plate 38 by the belt force tending to cock the arm means 25 on the shaft means 34, the thus compressed sleeve 77 tends to retard rotary movement of the belt engaging means 24 with such friction dampening means being particularly useful to prevent wearing out of the tensioner 20 for the reasons that are fully set forth in the aforementioned Henderson U.S. Pat. No. 4,596,538, and not need be further described except to state that such friction dampening means of the sleeve 77 is in addition to the noraml friction dampening means provided by the member 72 engaging against the surface 73 of the end plate 38 in a manner now to be described.

The member 72 has a plurality of guide projections 79 formed in a circular array on a side 80 of the member 72 and are respectively adapted to be received in openings 81 also formed in a circular array in a side 82' of the web portion 54 of the belt engaging means 24 in the manner illustrated in FIG. 2 so that the member 72 rotates with the belt engaging means 24 while being axially movable relative thereto through the action of the guides 79 in the openings 81.

Thus, a suitable spring means, such as the wavy spring means 82 illustrated in the drawings, is disposed between the member 72 and the side 82' of the belt engaging portion 25 to continuously urge the member 72 in a direction to place the inner surface of the closed end wall 74 thereof into frictional engagement with the surface 73 of the end plate 38 to provide for a friction dampening of the rotary movement of the belt engaging means 25 relative to the end plate 38 for the reasons previously set forth.

Therefore, it can be seen that the member 72 of this invention eliminates the need for a separate annular pad of friction material, a separate force plate means for such annular pad and a separate bearing means between the belt engaging portion and the end plate as required in the aforementioned Henderson U.S. Pat. No. 4,596,538.

Also, it can be seen that such unique member 72 of this invention not only performs a dampening function by being urged by the spring means 82 into frictional engagement with the surface 73 of the end plate means 38 to tend to retard rotary movement of the belt engaging means 25, but also the sleeve-like portion 77 of the member 72 of this invention tends to prevent cocking of the belt engaging portion 25 on the shaft means 34 to tend to prevent wearing out of the bearing means 57 as well as to provide a friction dampening means between the cylindrical part 55 of the belt engaging portion 25 and the outer peripheral surface 56 of the end plate 38 for the reasons previously set forth.

Therefore, it can be seen that this invention not only provides a new tensioner for a power transmission belt that is adapted to be operated in an endless path, but also this invention provides a new method of making such a belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is adapted to be operated in an endless path, said tensioner comprising a support means for being fixed relative to said belt, a belt engaging means carried by said support means and being movable relative thereto, first spring means operatively associated with said support means and said belt engaging means for urging said belt engaging means relative to said support means and against said belt with a force to tension said belt, and frictional dampening means operatively associated with said support means and said belt engaging means to dampen the movement of said belt engaging means relative to said support means in at least one direction of movement thereof, said dampening means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said dampening means comprising a pair of frictionally engaging first and second parts with said first part comprising an annular pad of friction material that is coaxially disposed and axially movable on said shaft means relative to said second part, and second spring means urging said first part against said second part with a certain spring force, said first part of said dampening means having guide means thereon, one of said support means and said belt engaging means having opening means therein that receive said guide means therein to guide axial movement of said first part, the improvement wherein said annular pad and said guide means of said first part of said dampening means comprise a one-piece homogeneous member.

2. A tensioner as set forth in claim 1 wherein said guide means comprise a plurality of guide projections disposed in a circular array, said opening means of said one of said support means and said belt engaging means comprising a plurality of openings disposed in a like circular array.

3. A tensioner as set forth in claim 1 wherein said second part of said dampening means comprises an end plate secured to the other of said support means and said belt engaging means.

4. A tensioner as set forth in claim 1 wherein said one of said support means and said belt engaging means comprises said belt engaging means, said portion of said belt engaging means being disposed on said shaft means for rotation relative thereto whereby said first part of said dampening means rotates in unison with said portion of said belt engaging means.

5. A tensioner as set forth in claim 4 wherein said second part of said dampening means comprises an end plate secured to said shaft means whereby said end plate remains stationary with said support means as said first part rotates with said belt engaging means relative thereto.

6. A tensioner as set forth in claim 5 wherein said end plate has a cylindrical outer periphery, said portion of said belt engaging means having a cylindrical part disposed substantially concentrically about said cylindrical outer periphery of said end plate, said first part of said dampening means comprising a tubular sleeve-like means disposed between said cylindrical outer periphery of said end plate and said cylindrical part of said belt engaging means to act as a bushing therebetween.

7. A tensioner as set forth in claim 6 wherein said tubular sleeve-like means is disposed against said cylindrical outer periphery of said end plate and said cylindrical part of said belt engaging means to tend to prevent cocking of said portion of said belt engaging means on said shaft means.

8. A tensioner as set forth in claim 7 wherein said tubular sleeve-like means extends from one side of said annular pad and said guide means extends from the other side of said annular pad.

9. A tensioner as set forth in claim 8 wherein said tubular sleeve-like means comprises part of said one-piece homogeneous member.

10. A tensioner as set forth in claim 9 wherein said one-piece homogeneous member is formed of polymeric material.

11. In a method of making a tensioner for a power transmission belt that is adapted to be operated in an endless path, said tensioner comprising a support means for being fixed relative to said belt, a belt engaging means carried by said support means and being movable relative thereto, first spring means operatively associated with said support means and said belt engaging means for urging said belt engaging means relative to said support means and against said belt with a force to tension said belt, and frictional dampening means operatively associated with said support means and said belt engaging means to dampen the movement of said belt engaging means relative to said support means in at least one direction of movement thereof, said dampening means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said dampening means comprising a pair of frictionally engaging first and second parts with said first part comprising an annular pad of friction material that is coaxially disposed and axially movable on said shaft means relative to said second part, and second spring means urging said first part against said second part with a certain spring force, said first part of said dampening means having guide means thereon, one of said support means and said belt engaging means having opening means therein that receive said guide means therein to guide axial movement of said first part, the improvement comprising the step of forming said annular pad and said guide means of said first part of said dampening means to comprise a one-piece homogeneous member.

12. A method of making a tensioner as set forth in claim 11 and including the steps of forming said guide means to comprise a plurality of guide projections disposed in a circular array, and forming said opening means of said one of said support means and said belt engaging means to comprise a plurality of openings disposed in a like circular array.

13. A method of making a tensioner as set forth in claim 11 and including the step of forming said second part of said dampening means to comprise an end plate secured to the other of said support means and said belt engaging means.

14. A method of making a tensioner as set forth in claim 11 and including the steps of forming said one of said support means and said belt engaging means to comprise said belt engaging means, and disposing said portion of said belt engaging means on said shaft means for rotation relative thereto whereby said first part of said dampening means rotates in unison with said portion of said belt engaging means.

15. A method of making a tensioner as set forth in claim 14 and including the step of forming said second part of said dampening means to comprise an end plate secured to said shaft means whereby said end plate remains stationary with said support means as said first part rotates with said belt engaging means relative thereto.

16. A method of making a tensioner as set forth in claim 15 and including the steps of forming said end plate to have a cylindrical outer periphery, forming said portion of said belt engaging means to have a cylindrical part disposed substantially concentrically about said cylindrical outer periphery of said end plate, and forming said first part of said dampening means to comprise a tubular sleeve-like means disposed between said cylindrical outer periphery of said end plate and said cylindrical part of said belt engaging means to act as a bushing therebetween.

17. A method of making a tensioner as set forth in claim 16 and including the step of disposing said tubular sleeve-like means against said cylindrical outer periphery of said end plate and against said cylindrical part of said belt engaging means to tend to prevent cocking of said portion of said belt engaging means on said shaft means.

18. A method of making a tensioner as set forth in claim 17 and including the step of forming said tubular sleeve-like means to extend from one side of said annular pad and said guide means to extend from the other side of said annular pad.

19. A method of making a tensioner as set forth in claim 18 and including the step of forming said tubular sleeve-like means to comprise part of said one-piece homogeneous member.

20. A method of making a tensioner as set forth in claim 19 and including the step of forming said one-piece homogeneous member of polymeric material.

* * * * *